Patented Aug. 10, 1926.

1,595,455

UNITED STATES PATENT OFFICE.

MELVIN DE GROOTE, OF ST. LOUIS, AND WILBUR C. ADAMS, OF UNIVERSITY CITY, MISSOURI, ASSIGNORS TO WM. S. BARNICKEL & COMPANY, OF WEBSTER GROVES, MISSOURI, A CORPORATION OF MISSOURI.

PROCESS FOR TREATING PETROLEUM EMULSIONS.

No Drawing.    Application filed April 6, 1925.   Serial No. 21,209.

This invention relates to the treatment of emulsions of mineral oil and water, such as petroleum emulsions, for the purpose of separating the oil from the water.

Petroleum emulsions of the kind referred to are commonly known as "cut oil", "roily oil", "bottom settlings", etc., and consist of oil constituting the continuous phase of the emulsion, droplets of water distributed throughout the body of oil and constituting the dispersed phase and films of matter that encase the droplets of water. The conventional process for "breaking" such emulsions contemplates subjecting the emulsion to the action of a substance or compound which acts on the emulsion in such a manner that the water of the emulsion will separate from the oil when the emulsion is allowed to remain in a quiescent state, at a suitable temperature, after treatment. The pending application for patent of Melvin De Groote, Serial No. 757,737, filed December 23, 1924, describes a novel process for treating such emulsions to effect the separation of the water from the oil, which consists in coating the walls of fissures in the films surrounding the droplets of water with a substance that is capable of being wetted by water, thereby converting said fissures into water passageways through which the droplets of water in the films can escape, and thereafter coalesce.

We have discovered that carbohydrates possess some of the characteristics that are essential for a treating agent of the kind described in said De Groote application, namely, the ability to be wetted by water and the ability to disperse as a colloid through the continuous phase of the emulsion and adsorb on the walls of fissures in the encasing films, but carbohydrates alone or unchanged cannot be used successfully for "breaking" petroleum emulsions, on account of the fact that such material is so soluble that it will not remain on the walls of the fissures. In other words, carbohydrates as a class do not have the characteristics essential to a successful treating agent of the kind mentioned in said De Groote application, because they do not have the ability to form insoluble salts of the alkaline earths, or coarsely-dispersed compounds with the alkaline earths present in the brine of the emulsion, or to be substantially insoluble or coarsely dispersed themselves without reaction with said alkaline earths.

We have found, however, that many carbohydrate derivatives are susceptible of use in the treatment of petroleum emulsions, owing to the fact that they have the ability to be wetted by water and to adsorb strongly at interfacial surfaces and also the ability to form insoluble salts of the alkaline earths. Therefore, we propose to use a modified carbohydrate condensation derivative in which the carbohydrate group bears a simple genetic relationship to the parent material, as an agent to treat a petroleum emulsion to effect the separation of the oil and the water or brine. The material condensed with the modified carbohydrate can be any material such as a fatty acid, resin, naphthenic acid or an aromatic substance. The treating agent can be introduced into a producing well, it can be introduced into a conduit through which a petroleum emulsion is flowing, or it can be introduced into a tank in which a petroleum emulsion or petroleum emulsion sludge is stored, the quantity of the treating agent that is required to "break" the emulsion depending upon the nature and age of the emulsion and varying in ratio from 1 barrel of treating agent to 2,000 barrels of emulsion to 1 barrel of treating agent to 20,000 barrels of emulsion. The treating agent can even be introduced into a producing well in such a way that it will become mixed with water or oil that is emerging from the ground before said water and oil enter the barrel of the well pump or the tubing up through which said water and oil flow to the surface of the ground. After treatment the emulsion is allowed to stand in a quiescent state at a suitable temperature, so as to permit the water to separate from the oil, or it may be passed through a variety of apparatus such as hay tanks, gun barrels, and so forth, such as are now commonly used in the operation of "breaking" emulsions. It may even be passed through a centrifugal or an electrical dehydrator.

A treating agent of the kind referred to can be obtained by combining any suitable modified carbohydrate with an organic substance whose alkaline earth salt is insoluble, the particular method that is employed to obtain the derivative being immaterial, so long as the resultant product may be said to consist of a derivative obtained by the action of a chemical reagent on a carbohydrate, provided that the carbohydrate group bears a simple genetic relationship to the parent material. We have found those carbohydrate derivatives most valuable that represent the condensation or addition products with some somewhat dissimilar material, such as an aromatic compound or fatty acid. We have employed a number of methods for producing a treating agent of the kind contemplated by our invention, such as subjecting cellulose, which is a carbohydrate, to the action of an acetylating agent in excess, and subsequently adding thereto an hydroxy fatty acid, which is also acetylated, and combined with or condensed with cellulose. The resultant material is freed from excess acid and used in this state as a treating agent, or it can be saponified before it is used. Or, if desired, said resultant material can be combined with other materials of the kind now used to treat petroleum emulsions. Substantially the same procedure can be followed in the case of a nitrating agent. The cellulose is nitrated in the presence of an excess nitrating agent, and subsequently mixed with a fatty material which is also nitrated. The resultant material is again freed from excess acid and is then ready for use as a treating agent.

We desire to point out that the action of well-known reagents such as acetylating agents, nitrating agents or sulphonating agents alone on carbohydrates produce compounds having a mild treating action, but are vastly improved by combination with a dissimilar substance, as previously described. We prefer, however, to use the derivatives of carbohydrates obtained by the action of sulphonating agents, and more specifically, by the action of commercial 66° sulphuric acid. Substantially any technically pure carbohydrate can be used in obtaining our improved treating agent, such as sugar, dextrose, starch, cellulose, refined waste paper, purified wood stock, etc. Starch is particularly adaptable for this purpose, because it is readily available at a low price, in a pure form and in a finely powdered state, but, as previously stated, our invention is not limited to a derivative obtained from any particular carbohydrate or to a carbohydrate derivative obtained by the use of a sulphonating agent.

It is obvious that a chemical reaction of the type which we are disclosing can be conducted in a variety of manners. We prefer to add one part of the carbohydrate to fifteen parts of sulphuric acid with constant stirring. The reaction should preferably not rise above 60° centigrade. When all of the carbohydrate is dissolved, the resultant mass, after neutralization, can be used as a treating agent, but we prefer to unite this cellulose derivative with other materials or substances that endow it with more advantageous properties. Among such other materials or substances that we have found to be of considerable value are the aliphatic or aromatic compounds, which are susceptible to sulphonation, acetylation or nitration. We have used such materials as phenol, naphthalene, or anthracene, etc., as well as the fatty materials, such as oleic acid, ricinoleic acid, etc. Rosin and the petroleum acids such as naphthenic acids, are particularly desirable, due to their low cost. Generally, we prefer to use the previously prepared solution of carbohydrate derivative in sulphuric acid, in such a manner that the excess sulphuric acid will be present in sufficient amount to sulphonate the new material being introduced and still leave some excess sulphuric acid to accelerate the condensation or addition effect. For instance, in the use of oleic acid we have employed 100 parts of oleic acid and slowly added thereto 50 parts of the solution of carbohydrate prepared as previously directed. This reaction should take place below 80° centigrade and to that end the carbohydrate solution should not be added too quickly. The resulting mass of sulphonation reaction is subsequently washed by means of water or sodium sulphate solution, or dilute ammonia water, or by any other suitable means to remove the excess acid. The final material, after being dried or partially or totally dehydrated, is ready for use. The alkali salt of this substance may be converted into the alkaline earth salt by double decomposition with calcium or magnesium chloride. It may be saponified or esterified, or treated in some other manner without detracting from its valuable properties. We have found that castor oil, handled substantially as described, gives an excellent treating agent, and this is the substance that we prefer to use in connection with a derivative obtained from starch by means of sulphuric acid. It should be understood, however, that the carbohydrate derivative can be combined with both an aromatic and aliphatic compound. Moreover, more than one fatty acid can be used. For instance, a mixture of oleic acid and ricinoleic acid, or more than one aromatic such as naphthalene or phenol may be used. We have described this general procedure so that one skilled in the art can follow general chemical procedure in regard to chemical reactions, and the law of combining weights and prepare a large number and wide variety of carbohydrate derivative materials having the above described desirable properties.

In treating petroleum emulsions with such materials, the materials are used in any suitable solution or suspension or are used directly without solution. In so far that some of said materials may be substantially insoluble in oil and water we prefer to mix them with a suitable solublizing agent. Such solublizing agent would be an agent that would give a dispersion of the substance in either water or oil, as the case may be, and could consist of ammonium oleate, calcium oleate, saponin, etc. The solublizing agent need only be mixed with the carbohydrate derivative and the amount of solublizing agent used will be the minimum amount necessary to give a suitable dispersion of the carbohydrate derivative.

Having thus described our invention, what we claim as new and desire to secure by Letters Patent is:

1. A process for treating petroleum emulsions, characterized by subjecting the emulsion to the action of a modified carbohydrate condensation derivative in which the carbohydrate group bears a simple genetic relationship to the parent material.

2. A process for treating petroleum emulsions, characterized by subjecting the emulsion to the action of a modified carbohydrate condensation derivative in which the carbohydrate group bears a simple genetic relationship to the parent material, and which contains an organic substance whose alkaline earth salt is insoluble.

MELVIN DE GROOTE.
WILBUR C. ADAMS.